United States Patent [19]

Rademacher

[11] Patent Number: 4,791,509
[45] Date of Patent: Dec. 13, 1988

[54] MULTIPLE-SIZE-ACCEPTING CASSETTE LOADING MECHANISM

[75] Inventor: Karl-Heinz Rademacher, Alsbach, Fed. Rep. of Germany

[73] Assignee: Robert Bosch GmbH, Stuttgart, Fed. Rep. of Germany

[21] Appl. No.: 79,829

[22] Filed: Jul. 30, 1987

[30] Foreign Application Priority Data

Aug. 8, 1986 [DE] Fed. Rep. of Germany ....... 3626939

[51] Int. Cl.$^4$ ............................................ G11B 5/008
[52] U.S. Cl. ...................................................... 360/94
[58] Field of Search ...................... 360/94, 137, 88, 90, 360/93, 96.1, 96.5, 91, 92, 96.6, 97, 98, 99; 369/77.1, 77.2, 75.1

[56] References Cited

U.S. PATENT DOCUMENTS

| | | | |
|---|---|---|---|
| 4,379,313 | 4/1983 | Tsuchiya | 360/96.5 |
| 4,420,779 | 12/1983 | Takano et al. | 360/92 |
| 4,497,051 | 1/1985 | Takahashi et al. | 369/77.1 |
| 4,592,039 | 5/1986 | Toyoguchi et al. | 369/77.1 |

FOREIGN PATENT DOCUMENTS

| | | | |
|---|---|---|---|
| 0119970 | 9/1981 | Japan | 369/77.1 |
| 0080157 | 5/1985 | Japan | 360/96.5 |

*Primary Examiner*—Robert S. Tupper
*Assistant Examiner*—Andrew L. Sniezek
*Attorney, Agent, or Firm*—Frishauf, Holtz, Goodman & Woodward

[57] ABSTRACT

To prevent distortion of a cassette housing, and specifically of the top or plan surface (T) thereof upon engagement of the cassette housing with drive rollers, a drive shaft (34) extends transversely across the housing and carries a plurality of pairs of drive rollers (50,51; 52,53; 54,55), of increasing diameters starting from a central axis of symmetry (X—X), the respective pairs of rollers being spaced from each other by a distance which is just slightly smaller than the widths dimension of the respective cassette of the set to be introduced therein. A motor (35) is coupled to the shaft to rotate the shaft, for insertion, or ejecting movement.

5 Claims, 4 Drawing Sheets

MULTIPLE-SIZE-ACCEPTING CASSETTE LOADING MECHANISM

Reference to related patent, the disclosure of which is hereby incorporated by reference:
U.S. Pat. No. 4,379,313, Tsuchiya; U.S. Pat. No. 4,636,887, Kato et al Reference to related publication:
European Patent application publication No. 0 133 822, Shiratori.

Reference to related applications, assigned to the assignee of the present application, the disclosure of which is hereby incorporated by reference:
U.S. Ser. No. 079,820, filed July 30, 1987, Rademacher and Wolf, claiming German priority P No. 36 26 940.
U.S. Ser. No. 079,819, filed July 30, 1987, Rademacher claiming German priority P No. 36 26 941.
U.S. Ser. No. 079,832, filed July 30, 1987, Rademacher claiming German priority P No. 36 26 942.

The present invention relates to magnetic tape transducing apparatus and more particularly to automatic tape cassette loading or removal apparatus, and especially to tape cassettes in which two tape reels carry magnetic tape, the reels being arranged in a common plane, with the tape being wound between said reels and operating in a plane transversely to the plane in which the tape reels are located.

BACKGROUND

The referenced U.S. Pat. No. 4,379,313 describes a loading arrangement for magnetic tape cassettes in which, after a cassette has been preliminarily placed in the transducing apparatus, the tape is automatically pulled into the apparatus into transducing position. Upon a suitable command, the tape can be ejected, likewise by being automatically removed from the transducing position and pushed outwardly of the entrance/exit opening of the tape apparatus housing. The referenced disclosure is directed to a roller device which engages the upper side of the partially introduced cassette and, by frictional engagement and upon rotation of the rollers by a suitable motor, pulls the tape cassette into the housing for placement in transducing position. Upon reversal of the direction of the rollers, a tape cassette is ejected. This loading arrangement can be used only with cassettes of a single size. The engagement rollers are located at a given distance from each other which corresponds to the axial distance of the tape reels. It has been found that this is disadvantageous, since the tape cassette housing may deform due to the pressure of the frictional engagement rollers. This interferes with the introduction/ejection movement, and the continued pressure of the introduction/ejection rollers present against the housing of the cassette interferes with the winding operation of the cassette.

Magnetic tape can be used directly for audio signals; magnetic tape, however, is frequently also used for television signals and is also suitable to record digitally encoded television signals. It has been proposed to utilize various sizes of cassettes for digitally encoding television (TV) signals. The thickness of the cassettes will be the same—it is determined by the width of the magnetic tape to be used. The thickness will be standardized. The horizontal or surface dimensions of the cassette can be matched to the desired length of the tape to be retained on the tape reels. Three sizes of cassettes, for a single width of tape have been proposed, which are designated as S-small, M-medium and L-large. The sizes of the cassettes differ by different lengths and widths. For example, it has been proposed to provide a S-cassette of 172×109 mm; the M-cassette of 254×150 mm, and the L-cassette of 366×206 mm.

It is desirable to so construct the magnetic tape transducing apparatus that it can accept all sizes of cassettes without in any way modifying the apparatus. This is of particular importance for use of the transducing apparatus in studios, in which programs of longer and shorter operating time, respectively, are to be recorded or reproduced.

THE INVENTION

It is an object to provide a magnetic tape cassette loading or removal apparatus which is capable of accepting any one magnetic tape cassette of a set of cassettes of respectively different dimensions, and handle the cassettes gently without interfering with their operation by the presence of the removal/ejection apparatus.

Briefly, a drive shaft is provided extending transversely across the housing of the transducing apparatus. A plurality of pairs of driven friction rollers are located on the drive shaft, the rollers of any one pair being spaced from each other by a distance which is just slightly smaller than the width dimension of the respective cassettes of the set. The rollers of any one pair are located symmetrically with respect to a central axis of symmetry of the housing structure.

The arrangement has the advantage that cassettes of various sizes can be introduced, or ejected, with pressure being applied only at the edge portions of the cassettes, where the sidewalls provide strength to the cassettes so that they will not deform, or cause operation of the winding mechanism in the cassettes to be interfered with.

In accordance with a preferred feature of the invention, the rollers of the respective roller pairs are slightly differently dimensioned so that if a large (L) cassette is introduced, the rollers which are positioned to engage a M- or S-cassette will be spaced slightly from the L-cassette, thereby preventing engagement of the L-cassette by rollers not needed for it, and possible consequent interference with winding of the tape of the L-cassette.

THE DRAWINGS

DETAILED DESCRIPTION

Figure 1:
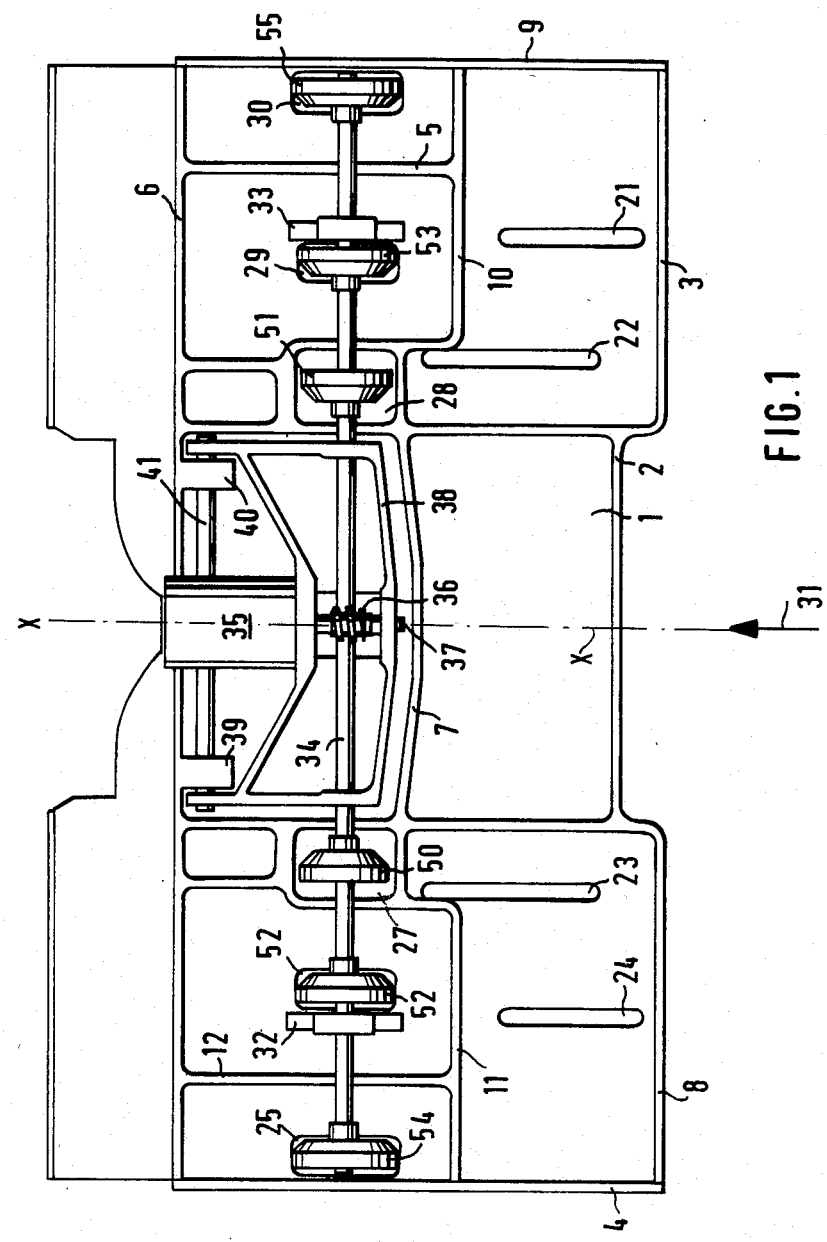
FIG. 1 is a general top plan view of an embodiment of the invention.

FIG. 1 generally shows the cover plate 1 for a cassette well, formed in a housing structure H. The housing structure H has an axis of symmetry X—X. Distributed over the cover plate 1, and at edge portions of a plurality of reinforcement ribs 2 to 12; the cover plate 1 is formed with a plurality of openings 21 to 30. The openings 25 to 30 extend along one line transversely to the axis of symmetry X, which coincides with the center line of a cassette to be introduced into the housing H in the direction of the arrow 31. Removal, of course, in counter the direction of arrow 31.

Two bearing blocks 32,33 retain a shaft 34, driven by a motor 35 via a worm drive. The shaft of the motor 35 has a worm 36 thereon which is in engagement with a worm wheel 37, secured to the shaft 34. The shaft 34 additionally is journalled in a frame 38, to which the drive motor 35 also is secured. The frame 38 is secured to the top cover 1 by a shaft 41 which is held on two blocks 39,40 secured to the top cover plate 1 of the housing H.

Three pairs of transport rollers 50,51; 52,53; and 54,55 are secured to the shaft 34, to rotate therewith. The respective rollers of the pairs are located symmetrically with respect to the transverse dimension of the cover plate 1, that is, symmetrical with respect to the axis of symmetry X—X. The spacing of associated transport rollers of a pair is so dimensioned that it is just slightly less than the transverse or width dimension of the respective cassettes of the set of cassettes. Specifically, the rollers of the pair 50,51 are used to operate on the smallest or S-cassette, and are so located that each one of the rollers 50,51 is positioned adjacent the sidewall of the respective cassette, to engage the upper surface of the cassette in the region of the strong sidewall thereof. Similarly, the rollers 52,53 of the pair for the M-cassette are so secured to the shaft 34 that each one of the rollers is in the vicinity of the stabilizing sidewall of the M-cassette, to engage the surface of the M-cassette thereon. Correspondingly, the rollers of the pair 54,55 engage a L-cassette at the top surface thereof close to the sidewall of the L-cassette; they are farthest from the axis of symmetry and at the outer side close to the limit of the cassette well.

Figure 2:
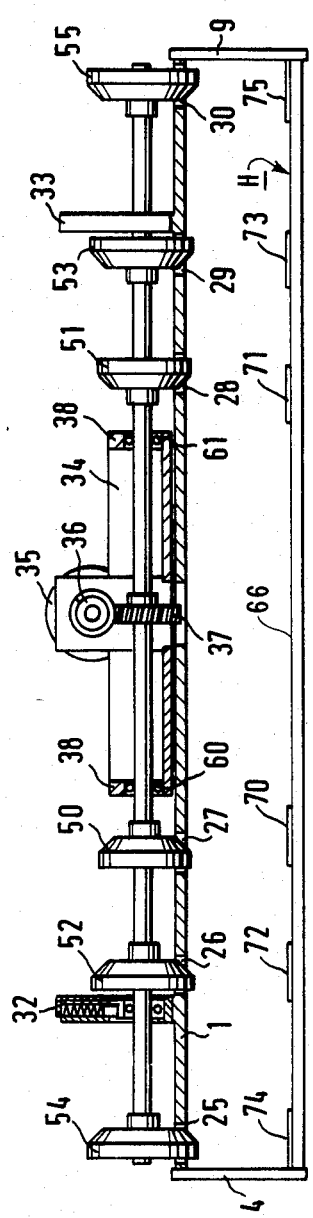
FIG. 2 is a front view of the apparatus, partly in section.

A transverse dimension of cassettes can best be visualized by reference to FIG. 2. The top cover plate 1 is shown in section. The drive motor 35, by the worm-worm gear combination 36,37 is in operative engagement with the drive shaft 34. Ribs 4 and 9 of the cover plate 1 extend in the direction of the base plate 66 of housing H, and, together with the sidewalls 4, 9 define the cassette well. Slide tracks 70,71; 72,73; and 74,75 are located on the bottom wall 66 to provide for easy insertion of the respective cassettes. The slide tracks may be of low fraction material. The rollers of the roller pairs 50,51; 52,53; or 54,55 engage through the corresponding openings 27,28; 26,29 and 25,30 against the top cover of an introduced cassette, by frictional engagement with the cassette top surface upon preliminary introduction in accordance with the arrow 31 (FIG. 1). Upon reversal of direction of rotation of the motor 35, the cassettes will be ejected. Frictional engagement pressure is provided by a biassing arrangement formed by springs 74 (FIG. 3) retained within the bearing blocks 32,33.

In accordance with a feature of the invention, the respective rollers of the roller pairs are so dimensioned that, if a larger one of the cassettes of the sets is introduced, the rollers pairs associated with the smaller cassettes will not engage the cassette surface of the larger cassette being introduced. Such engagement might lead to deformation of the top cover plate or cover surface of the respective cassette, and would engage such a cassette not at the point of greater strength—where the sidewalls are positioned—but rather intermediate of the sidewalls. In accordance with a feature of the invention, thus, the diameters of the rollers of the roller pairs are staggered. The diameters of the drive roller pair 50,51 to drive the smallest or S-cassette will have the smallest diameter; the drive roller pair 52,53 will have a diameter which is just slightly larger, and the effective diameter of the largest drive roller pair 54,55 for the L-cassette again is slightly greater. The top cover surface of the respective cassettes, before engagement by the respective rollers, is shown in broken lines in FIG. 3 at T. This arrangement ensures that a stable, sufficiently rigid drive shaft 34 will lift those rollers which are not then needed to introduce or eject a cassette off the surface of the respective cassette, as best seen in FIG. 3.

Figure 3:
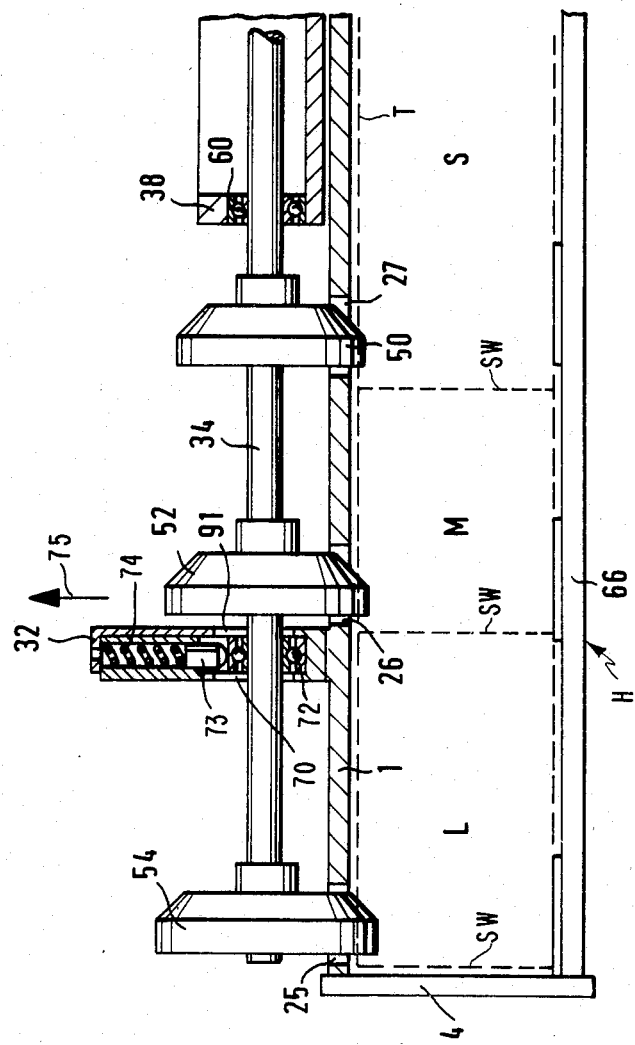
FIG. 3 is a fragmentary front view, to an enlarged scale.

FIG. 3 illustrates to an enlarged scale, the left end of the cassette well with the sidewall 4, the bottom or base plate 66 and the cover plate 1. The bearing block 32 is shown in cross-section. It is formed with two symmetrically placed lateral elongated holes 70. The bearing 72 is biassed downwardly by engagement with a pressure plug 73 which is biassed by a spring 74, the free end of which is engaged with the cover of the bearing block 32, for example by a screw connection. Thus, shaft 34 is biassed counter the direction of the arrow 75 (FIG. 3). The drive rollers 50,52,54 on the shaft 34 thus are pressed downwardly through the respective openings 26,25 of the cover plate 1 and engage the cassette, the top surface of which is shown by broken line T. The respective sizes of the cassettes, which vary only in their plan outline, is likewise indicated by broken lines at S, M and L.

OPERATION

To introduce a cassette, the cassette is placed, preliminarily, in the cassette well, by introducing the cassette in the direction of the arrow 31 (FIG. 1). When the cassette is partly introduced, and upon energization of the motor 35, the respective rollers of the roller pairs will engage the top surface T of the cassette and pull the top surface, and the associated cassette into the housing H. The drive shaft 34 is lifted slightly in the direction of the arrow 75 (FIG. 3) and presses the respective rollers of the associated roller pair against the top surface T of the respective cassette of the set of cassettes with the force of the biassing springs 74.

To eject a cassette, the direction of the motor is reversed, and the cassette is ejected, in a direction counter the arrow 31 (FIG. 1).

Figure 4:
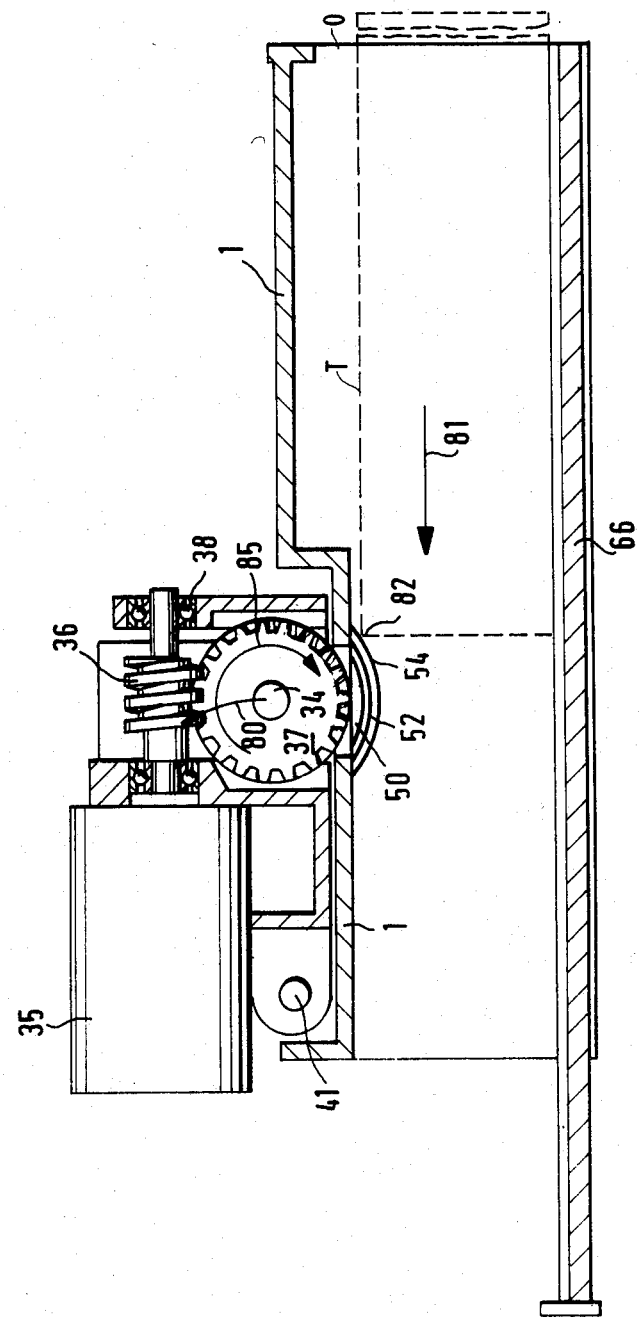
FIG. 4 is a side view, partly in section, to the same scale as FIG. 3.

FIG. 4 illustrates the drive arrangement in detail, and shows the worm 36 and the worm gear 37, coupled to the drive shaft 34. The drive shaft 34, together with the motor 35, can tilt about the pivot axis of shaft 41, as seen by arrow 80 when a cassette, illustrated in broken lines is introduced into the cassette well. The leading edge 82 of the cassette will engage one of the transport rollers 50,52 or 54, in dependence on the size of the cassette. Upon rotation of the worm wheel 37 to drive the shaft 34 in clockwise direction—see arrow 85—the cassette is pulled in completely into the cassette well. To eject the cassette, the drive motor is reversed. The drive shaft 34 is guided in the bearing blocks 32,33 in a linear direction, whereas the frame 38 pivots about the pivot axis 41. There is, considered strictly, a discrepancy which may lead to statically undetermined loading of the drive shaft 34. Since the pivot angle, however, is very small—a few degrees—the deviation between the circular movement of the frame 38 and the straight line guidance of the drive shaft 34 can be neglected; there is sufficient play in the bearing blocks 32,33. Additionally, the pivot axis 41 can be secured in the blocks 39,40 with some play in horizontal direction.

Various changes and modifications may be made within the scope of the inventive concept.

I claim:

1. Automatic tape cassette reciprocation apparatus to load one of a set of generally rectangular magnetic tape cassettes of different widths dimensions into a housing structure (H) after partial insertion of the tape cassette into an opening (O) of the housing structure, and to unload or eject tape cassettes from the housing structure, comprising, a drive shaft (34) rotatably secured to the housing structure and extending transversely with respect to cassette reciprocation direction (31, 81);

a plurality of pairs of drive rollers (50,51; 52,53; 54,55) located on the drive shaft, the rollers of any one pair being spaced from each other by a distance which is approximately of, or slightly smaller than, the width dimension of the respective cassette of the set of cassettes, and the rollers of any pair being located symmetrically with respect to a central axis of symmetry (X—X) parallel to cassette reciprocation direction and which bisects said opening, for engagement with a major surface of the respective cassette in the vicinity of a sidewall (SW) of the cassette, the respective diameters of the roller pairs increasing with increasing distance from said central axis, thereby assuring that, regardless of cassette width, each cassette will be driven adjacent its sidewalls rather than adjacent its tape reels;

and drive means (35) coupled to the drive shaft (34) for rotating said drive shaft and hence the plurality of pairs of drive rollers.

2. The apparatus of claim 1, further comprising resilient engagement means (32,73,74) biassing the shaft (34), and hence the pairs of rollers (50 . . . 55) thereon towards the major surface of a cassette to be engaged in the housing structure.

3. The apparatus of claim 2, wherein the drive rollers of the pairs (50 . . . 55) have diameters of increasing dimension as the distance from said axis of symmetry increases to provide for clearance of rollers opposite a cassette which does not have its side walls between the rollers engaging the respective cassette.

4. The apparatus of claim 2, wherein said resilient bias means acts continuously on said shaft to retain the cassette in biassed holding engagement with the respective pairs of rollers, regardless of rotation of the shaft (34).

5. The apparatus of claim 4, wherein the drive rollers of the pairs (50 . . . 55) have diameters of increasing dimension as the distance from said axis of symmetry increases to provide for clearance of rollers opposite a cassette which does not have its side walls between the rollers engaging the respective cassette.

* * * * *